US012243506B2

(12) United States Patent
Song et al.

(10) Patent No.: US 12,243,506 B2
(45) Date of Patent: Mar. 4, 2025

(54) SOUND ABSORBING DEVICES AND ACOUSTIC RESONATORS DECORATED WITH FABRIC

(71) Applicant: Toyota Motor Engineering & Manufacturing North America, Inc., Plano, TX (US)

(72) Inventors: Yuyang Song, Ann Arbor, MI (US); Taehwa Lee, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 287 days.

(21) Appl. No.: 17/883,925

(22) Filed: Aug. 9, 2022

(65) Prior Publication Data

US 2024/0054985 A1 Feb. 15, 2024

(51) Int. Cl.

| | |
|---|---|
| ***G10K 11/172*** | (2006.01) |
| ***D03D 15/33*** | (2021.01) |
| ***D03D 15/567*** | (2021.01) |
| ***G10K 11/162*** | (2006.01) |

(52) U.S. Cl.

CPC ........... *G10K 11/172* (2013.01); *D03D 15/33* (2021.01); *D03D 15/567* (2021.01); *G10K 11/162* (2013.01); *D10B 2401/04* (2013.01)

(58) Field of Classification Search

CPC .... G10K 11/162; G10K 11/172; D03D 15/33; D03D 15/567; D10B 2401/04

See application file for complete search history.

(56) References Cited

U.S. PATENT DOCUMENTS 4,548,292 A * 10/1985 Noxon ...................... E04B 1/84 181/290

5,444,198 A * 8/1995 Gallas ................... E04B 1/8209 181/295

7,178,630 B1 * 2/2007 Perdue .................. E04B 1/8209 181/290

(Continued)

OTHER PUBLICATIONS

Tabor et al.,"Smart Textile-Based Personal Thermal Comfort Systems: Current Status and Potential Solutions," Advanced Materials Technologies, vol. 5, Mar. 17, 2020, pp. 1-40.

(Continued)

*Primary Examiner* — Forrest M Phillips

(74) *Attorney, Agent, or Firm* — Christopher G. Darrow; Darrow Mustafa PC

(57) ABSTRACT

A sound absorbing device includes an acoustic resonator with an opening and at least one fabric layer extending across the opening. The at least one fabric layer includes reversible actuatable liquid crystal elastomer (LCE) fibers such that an average pore size of the at least one fabric layer increases with decreasing temperature and decreases with increasing temperature. The sound absorbing device also includes at least one of a heater configured to heat the at least one fabric layer such that the average pore size of the at least one fabric decreases and a cooler configured to cool the at least one fabric layer such that the average pore size of the at least one fabric increases. And in some variations a controller configured to command the heater to heat to the at least one fabric layer and command the cooler to cool the at least one fabric layer is included.

20 Claims, 4 Drawing Sheets

(56) References Cited

U.S. PATENT DOCUMENTS

| | | | | |
|---|---|---|---|---|
| 8,157,052 | B2 * | 4/2012 | Fujimori | G10K 11/175 181/295 |
| 8,607,929 | B2 * | 12/2013 | Bliton | E04B 1/8409 181/294 |
| 10,767,365 | B1 * | 9/2020 | Noxon, IV | E04B 1/8404 |
| 2017/0030610 | A1 * | 2/2017 | Schaake | G10K 11/172 |
| 2021/0198817 | A1 * | 7/2021 | Göktepe | F03G 7/06 |
| 2021/0358468 | A1 * | 11/2021 | Lee | G10K 11/172 |

OTHER PUBLICATIONS

Hu et al., "A review of stimuli-responsive polymers for smart textile applications," Smart Mater. Struct. 21, Apr. 18, 2012, pp. 1-24.

* cited by examiner

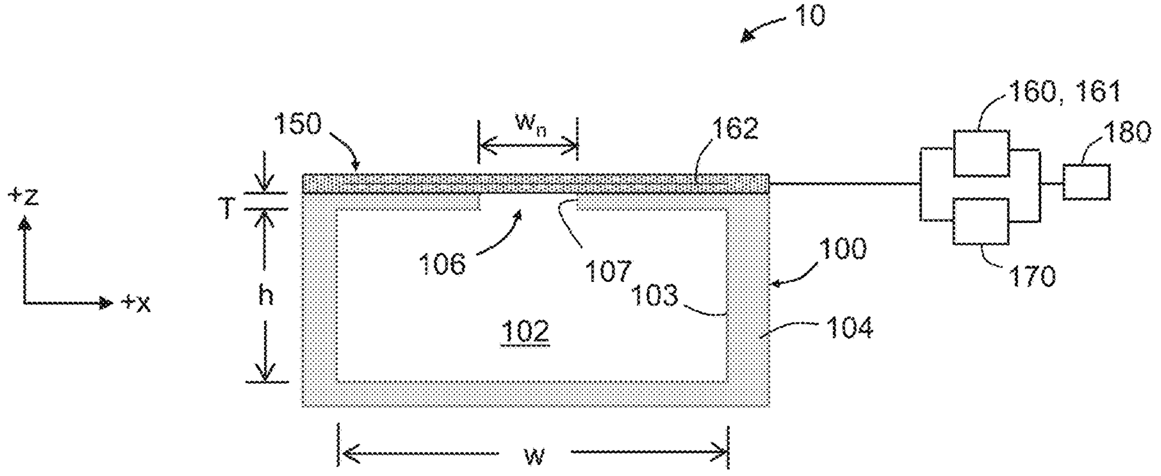
FIG. 1
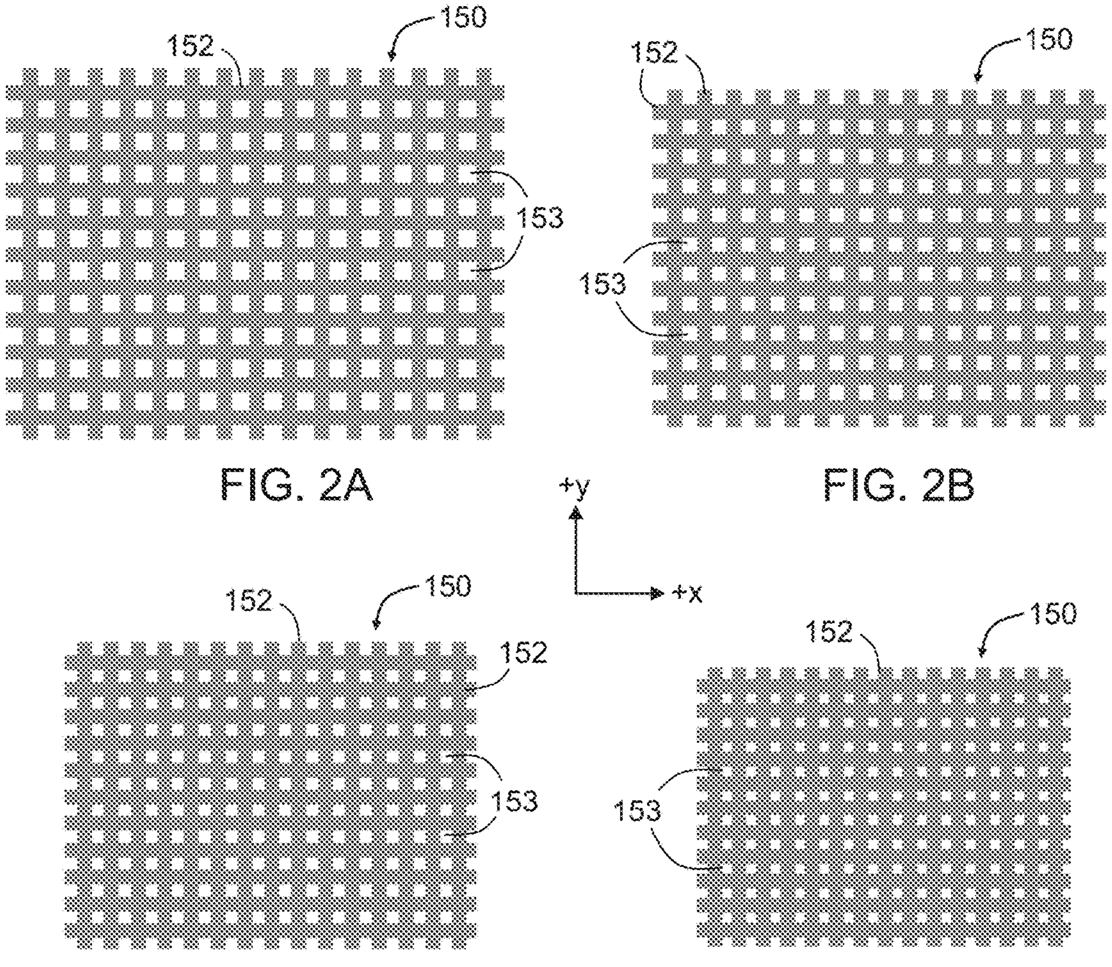
FIG. 2A
FIG. 2B
FIG. 2C
FIG. 2D

SOUND ABSORBING DEVICES AND ACOUSTIC RESONATORS DECORATED WITH FABRIC

TECHNICAL FIELD

The present disclosure relates generally to sound absorbing devices, and particularly to sound absorbing devices that include acoustic resonators.

BACKGROUND

Acoustic resonators, e.g., Helmholtz resonators and quarter-wave tubes, are used for acoustic absorption of specific frequency ranges. In addition, multiple acoustic resonators of different sizes can be used for broadband acoustic absorption, however such structures can be cost and structurally prohibitive.

The present disclosure addresses issues related to the use of acoustic resonators for broadband acoustic absorption, and other issues related to acoustic absorption.

SUMMARY

This section provides a general summary of the disclosure and is not a comprehensive disclosure of its full scope or all of its features.

In one form of the present disclosure, a sound absorbing device includes an acoustic resonator with an opening and at least one fabric layer extending across the opening. In addition, the at least one fabric layer includes actuatable liquid crystal elastomer (LCE) fibers such that the at least one fabric layer is configured to change its average pore size as a function of temperature.

In another form of the present disclosure, a sound absorbing device includes an acoustic resonator with an opening and at least one fabric layer extending across the opening. In addition, the at least one fabric layer includes reversible actuatable liquid crystal elastomer (LCE) fibers such that an average pore size of the at least one fabric layer increases with decreasing temperature and decreases with increasing temperature.

In still another form of the present disclosure, a sound absorbing device includes an acoustic resonator with an opening and at least one fabric layer extending across the opening. The at least one fabric layer includes reversible actuatable liquid crystal elastomer (LCE) fibers such that an average pore size of the at least one fabric layer increases with decreasing temperature and decreases with increasing temperature. The sound absorbing device also includes at least one of a heater configured to heat the at least one fabric layer such that the average pore size of the at least one fabric decreases and a cooler configured to cool the at least one fabric layer such that the average pore size of the at least one fabric increases. And in some variations a controller configured to command at least one of the heater to heat to the at least one fabric layer and the cooler to cool the at least one fabric layer is included.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 1 shows a sound absorbing device according to the teachings of the present disclosure;

FIG. 2A shows fabric in FIG. 1 with a predefined first average pore size according to the teachings of the present disclosure;

FIG. 2B shows fabric in FIG. 1 with a predefined second average pore size according to the teachings of the present disclosure;

FIG. 2C shows fabric in FIG. 1 with a predefined third average pore size according to the teachings of the present disclosure;

FIG. 2D shows fabric in FIG. 1 with a predefined fourth average pore size according to the teachings of the present disclosure;

DETAILED DESCRIPTION

Figure 3:
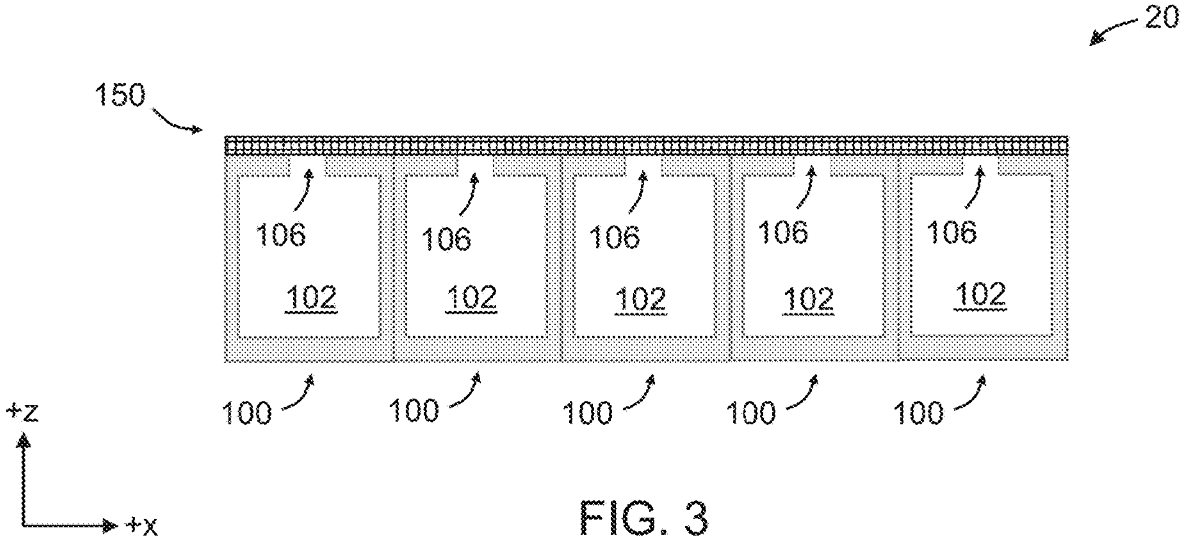
FIG. 3 shows a plurality of Helmholtz resonators of the same size decorated with fabric according to the teachings of the present disclosure.

The present disclosure provides sound absorbing devices with one or more acoustic resonators (referred to herein simply as "acoustic resonator") decorated with fabric. The acoustic resonator includes a chamber with a cavity and an opening that provides fluid communication between an interior of the chamber and an exterior of the chamber. The chamber without the fabric is a lossy resonator for a predefined narrow range of acoustic frequencies and a lossless resonator for acoustic frequencies outside the predefined narrow range. However, sound absorbing devices according to the teachings of the present disclosure cover (decorate) the opening of the chamber with at least one fabric layer such that the acoustic resonator is a lossy acoustic resonator for acoustic frequencies outside the predefined narrow range of the chamber. In addition, the at least one fabric layer is configured to desirably change its average pore size as a function of temperature such that the range acoustic frequencies absorbed by the sound absorbing devices can be adjusted. For example, in some variations, the at least one fabric layer includes actuatable liquid crystal elastomer (LCE) fibers that change at least one of shape and dimension as a function of temperature such that the average pore size of the at least one fabric layer changes as a function of temperature. And in such variations, the range of acoustic frequencies outside the predefined narrow range of the chamber can be adjusted by changing the temperature of the at least one fabric layer. Stated differently, the sound absorbing devices according to the teachings of the present disclosure provide acoustic dissipation for a broad range of acoustic frequencies using a simple design or structure.

Referring to FIG. 1, a sound absorbing device 10 according to the teachings of the present disclosure includes an acoustic resonator 100 (also referred to herein as a "chamber") with a cavity 102 of gas (e.g., air) defined by an interior or inner surface 103 of at least one wall 104. The acoustic resonator 100 includes an opening 106 defined by at least one edge 107 of the at least one wall 104 and at least one fabric layer 150 extending across the opening as discussed in greater detail below. In some variations, the opening is a slit, i.e., an opening with a length greater than a width. And in at least one variation, the acoustic resonator 100 is approximated or modeled as a Helmholtz resonator with the cavity 102 having a volume 'V' and the opening 106 having a thickness 'T' and an area 'A'. In such variations, the acoustic resonator 100 has a single isolated resonant frequency '$f$' defined as:

$$f = \left(\frac{S}{2\pi}\right)\sqrt{\frac{A}{TV}} \quad \text{Eq. 1}$$

where 'S' is the speed of sound. In addition, the acoustic resonator 100 can absorb a band of frequencies and reemit the frequencies with the opposite phase such that the reemitted frequencies interfere with the incoming sound waves via attenuation.

The at least one fabric layer 150 has a predefined thickness, an average pore size and an average porosity at a predefined temperature (e.g., room temperature≅23° C.), and can be made or formed from any type of fabric suitable for use to enhance acoustic loss. Non-limiting examples of fabric include silk, wool, linen cotton, rayon, nylon, polyesters, and combinations thereof, including woven fabrics such as plain weave fabric, twill weave fabric, and satin weave fabric. It should be understood that fabric generally absorbs acoustic waves by converting acoustic energy of acoustic waves into heat.

The at least one fabric layer 150 also includes actuatable LCE fibers 152 (FIGS. 2A-2D) defined herein as LCE fibers configured to change at least one of shape and dimension as a function of temperature. In some variations, the at least one fabric layer 150 is formed exclusively from the actuatable LCE fibers 152, e.g., the at least one fabric layer 150 is woven exclusively from the actuatable LCE fibers 152. In other variations, the at least one fabric layer 150 is formed from a combination of the actuatable LCE fibers 152 and other fibers selected from silk, wool, linen cotton, rayon, nylon, polyesters, and combinations thereof.

Not being bound by theory, the actuatable LCE fibers 152 can include cross-linked polymer networks that contain rigid, anisotropic mesogenic units incorporated into the polymer chains. And due to the anisotropic nature of the anisotropic mesogenic units, the actuatable LCE fibers 152 exhibit a liquid crystalline structure in which the mesogenic units have an orientational order but remain individually mobile and can flow with respect to one another. For example, in a "nematic phase," the mesogenic units of the actuatable LCE fibers are preferentially aligned in a given direction but have no positional order and no crystalline regularity. Accordingly, when the mesogenic units are topologically fixed via incorporation into a crosslinked polymer network, an overall distortion in the dimensions of the polymer network occurs through liquid crystalline phase transition. For example, in some variations the actuatable LCE fibers exhibit up to 300% uniaxial deformation via a liquid crystalline phase transition and such deformation is used to control and change the average pore size of the at least one fabric layer 150 as described in greater detail below. Also, non-limiting methods or process of manufacturing the actuatable LCE fibers 152 include electro spinning to form electro spun actuatable LCE fibers, direct ink writing to form direct ink write actuatable LCE fibers, among others.

Still referring to FIG. 1, in some variations the sound absorbing device includes a heating device 160 configured to heat the actuatable LCE fibers 152 (i.e., increase the temperature of the actuatable LCE fibers 152), a cooling device 170 configured to cool heat the actuatable LCE fibers 152 (i.e., decrease the temperature of the actuatable LCE fibers 152), and/or a controller 180 configured to command the heating device 160 and/or the cooling device 170 to heat and/or cool, respectively, the actuatable LCE fibers 152. In at least one variation, the heating device 160 and/or the cooling device 170 are part of a heating, venting, air conditioning (HVAC) system for a structure (e.g., a room, vehicle, among others) that includes the sound absorbing device 10. In other variations, the heating device 160 and/or the cooling device 170 are/is standalone unit(s) dedicated exclusively to the sound absorbing device 10.

In at least one variation, the heating device 160 is a heater configured to blow heated gas (e.g., air) onto the actuatable LCE fibers 152 and/or the cooling device is a cooler configured to blow cooled gas onto the actuatable LCE fibers 152. In another variation, the heating device 160 includes a radiate heater configured to heat the actuatable LCE fibers via heat radiation. And in some variations the heating device 160 includes one or more electrical wires 162 (e.g., a copper wire) in contact with the at least one fabric layer 150 and an electrical power source 161 configured to supply electrical current to the one or more electrical wires 162, In such variations the one or more electrical wires 162 are desirably heated from a first temperature to a second temperature and the actuatable LCE fibers 152 are heated via heat conduction from the one or more electrical wires 162.

Referring to FIGS. 2A-2D, a top view of the at least one fabric layer 150 (i.e., viewing the at least one fabric layer 150 in the −z direction) with the actuatable LCE fibers 152 and a plurality of pores 153 (also referred to herein simply as "pores 153") is shown. Particularly, FIG. 2A illustrates the at least one fabric layer 150 with the pores 153 having a predefined first average pore size, FIG. 2B illustrates the at least one fabric layer 150 with the pores 153 having a predefined second average pores size that is less than the first predefined average pore size. In addition, FIG. 2C illustrates the at least one fabric layer 150 with the pores 153 having a predefined third average pore size that is less than the predefined second average pore size and FIG. 2B illustrates the at least one fabric layer 150 with the pores 153 having a predefined fourth average pore size that is less than the predefined third average pore size.

It should be understood that the change in average pore size of the at least one fabric layer 150 is executed or enabled by actuation of the actuatable LCE fibers 152. For example, in some variations the actuatable LCE fibers decrease in length (i.e., contract) with an increase in temperature. In such variations, FIG. 2A illustrates the actuatable LCE fibers 152 and thus the at least one fabric layer 150 at a first temperature, FIG. 2B illustrates the actuatable LCE fibers 152 at a second temperature greater than the first temperature, FIG. 2C illustrates the actuatable LCE fibers 152 at a third temperature greater than the second temperature, and FIG. 2D illustrates the actuatable LCE fibers 152 at a fourth temperature greater than the third temperature. Accordingly, and given the contraction of the actuatable LCE fibers 152 with increasing temperature, the average pore size of the pores 153 is controlled and changes as a function of temperature as illustrated in FIGS. 2A-2D. In addition, in some variations the actuatable LCE fibers 152 are reversibly actuatable LCE fibers 152 such that the average pore size for the pores increases by decreasing the temperature of the actuatable LCE fibers 152. That is, the change on the average size of the pores 153 from the predefined first average pore size to the predefined second average pore size, from the predefined second average pore size to the predefined third average pore size, and the predefined third average pore size to the predefined fourth average pore size is reversible.

In other variations, the actuatable LCE fibers decrease in length with a decrease in temperature. In such variations, FIG. 2A illustrates the actuatable LCE fibers 152 and thus the at least one fabric layer 150 at a first temperature, FIG. 2B illustrates the actuatable LCE fibers 152 at a second temperature less than the first temperature, FIG. 2C illustrates the actuatable LCE fibers 152 at a third temperature less than the second temperature, and FIG. 2D illustrates the actuatable LCE fibers 152 at a fourth temperature less than the third temperature. In addition, in some variations the actuatable LCE fibers 152 are reversibly actuatable LCE fibers 152 such that the average pore size for the pores increases with increasing temperature of the actuatable LCE fibers 152.

In some variations, the average pore size of the pores 153 is controlled and adjusted between about 0.1 micrometers (μm) and about 500 μm. In at least one variation, the average pore size of the pores 153 is controlled and adjusted between about 0.2 μm and about 200 μm. And in some variations, the average pore size of the pores 153 is controlled and adjusted between about 0.5 μm and about 100 μm.

Accordingly, it should be understood from FIGS. 2A-2D that the shape and/or dimension of the actuatable LCE fibers 152 of the at least one fabric layer 150 can be controlled such that the pore size of the pores 153 is adjusted (changed) and such adjustment increases and/or decreases the range of acoustic frequencies absorbed by the at least one fabric layer 150 and the sound absorbing device 10. For example, in some variations the size of the opening 106 of the acoustic resonator 100 is generally equal to or approximated by the area of the pores 153 in the x-y plane. And in such variations, decreasing or increasing the average pore size of the pores 153 effectively decreases or increases, respectively, the opening 106, and thus the resonant frequency $f$ of the acoustic resonator 100. In addition, changing the average pore size of the at least one fabric layer 150 changes the acoustic dissipation provided by the at least one fabric layer 150. For example, in some variations the area 'A' in Equation 1 and FIG. 1 is selected or predefined as a function of a desired resonance frequency where $A=A_o \cdot \sigma$, $A_o$ is the area of the opening 106, $\sigma$ is the porosity of the at least one fabric layer 150, and $\sigma$ varies between 0.0 and 0.9.

Figure 4:
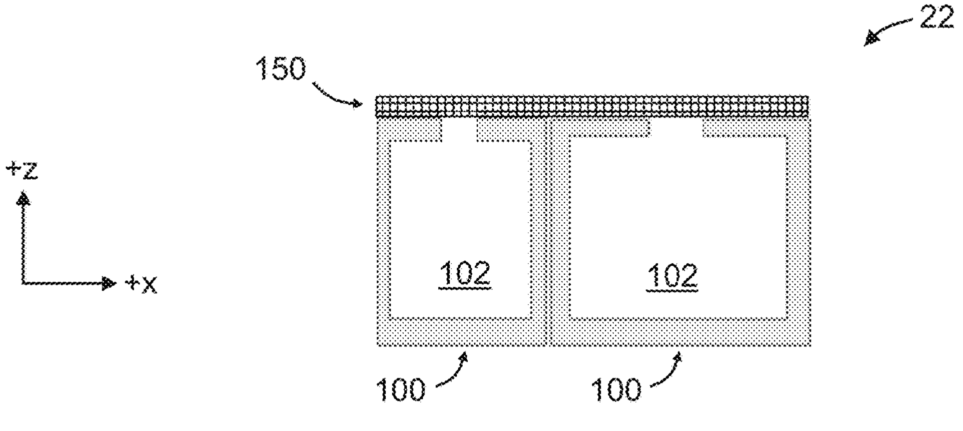
FIG. 4 shows two Helmholtz resonators of different size decorated with fabric according to the teachings of the present disclosure.
Figure 5:
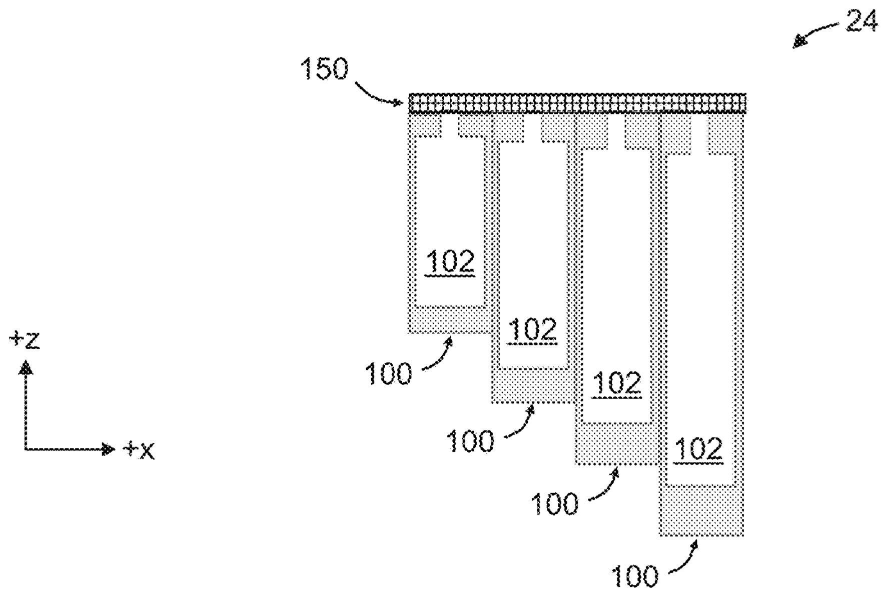
FIG. 5 shows a Helmholtz resonators decorated with fabric according to the teachings of the present disclosure.

While FIG. 1 illustrates a sound absorbing device with a single acoustic resonator 100, it should be understood that sound absorbing devices according to the teachings of the present disclosure can include more than one acoustic resonator. For example, and with reference to FIG. 3, a sound absorbing device 20 with a plurality of acoustic resonators 100 and at least one fabric layer 150 as discussed above is shown. In addition, FIG. 4 illustrates a first acoustic resonator 100 and a second resonator 110 with the at least one fabric layer 150 as discussed above, and the second acoustic resonator is different (e.g., different in size and/or material of construction) than the first acoustic resonator 100. And referring to FIG. 5, a sound absorbing device 24 with a plurality of different Helmholtz resonators 120, 122, 124, 126 (e.g., different in size and/or material of construction) with the at least one fabric layer 150 as discussed above is shown.

Figure 6A:
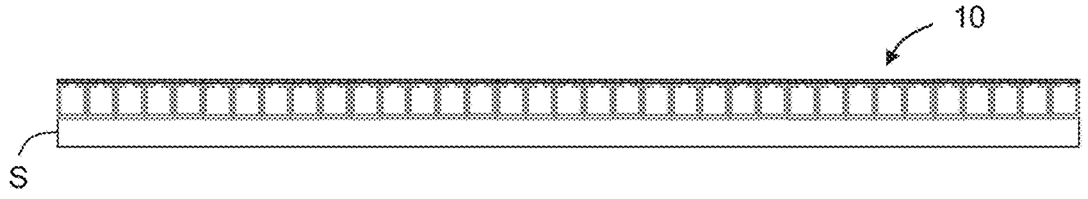
FIG. 6A shows a substrate 'S' with a plurality of acoustic resonators covering a surface of the substrate S according to the teachings of the present disclosure.
Figure 6B:
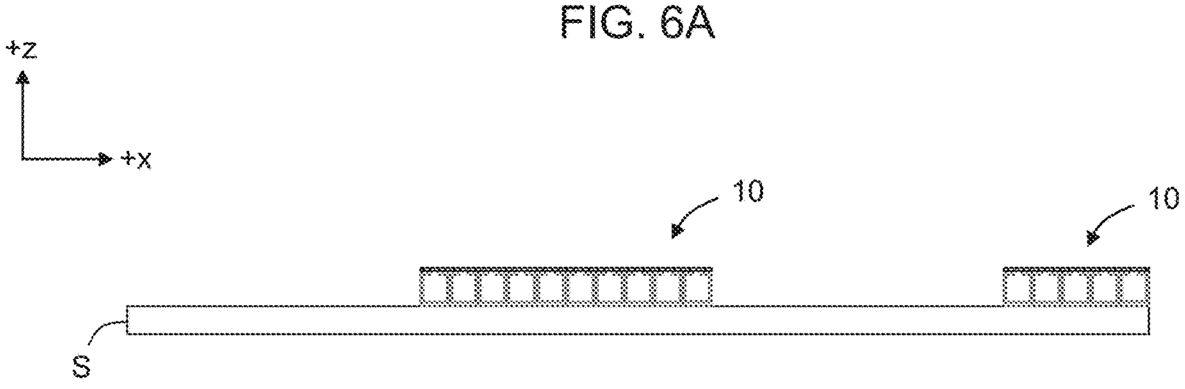
FIG. 6B shows a substrate 'S' with a plurality of acoustic resonators covering only a portion of a surface of the substrate S according to the teachings of the present disclosure.

Referring to FIGS. 6A-6B a component or substrate 'S' with a plurality of sound absorbing devices 10 is shown (sound absorbing device 10 shown for example purposes only). In some variations, the plurality of sound absorbing devices 10 are disposed on or cover the entire substrate S as shown in FIG. 6A, while in other variations a plurality of sound absorbing devices 10 are disposed on or cover only a portion of the substrate S as shown in FIG. 6B. Non limiting examples of components and/or substrates that can have one or more sound absorbing devices disposed therein include interior motor vehicle panels, interior aircraft panels, interior wall panels, and others.

Figure 7A:
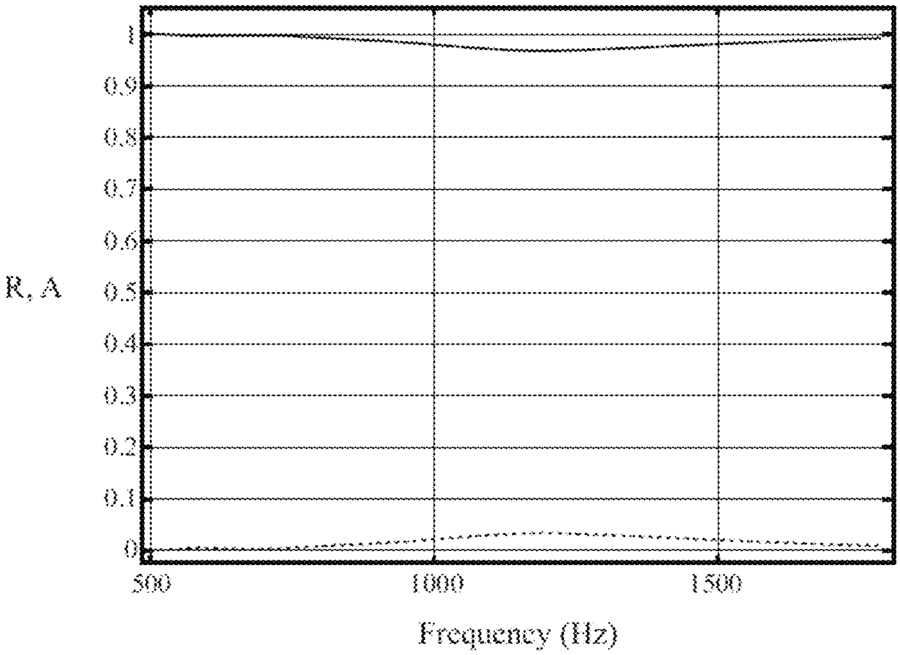
FIG. 7A is a plot of simulated reflectance/absorption as a function of an acoustic frequency for an acoustic resonator without fabric.
Figure 7B:
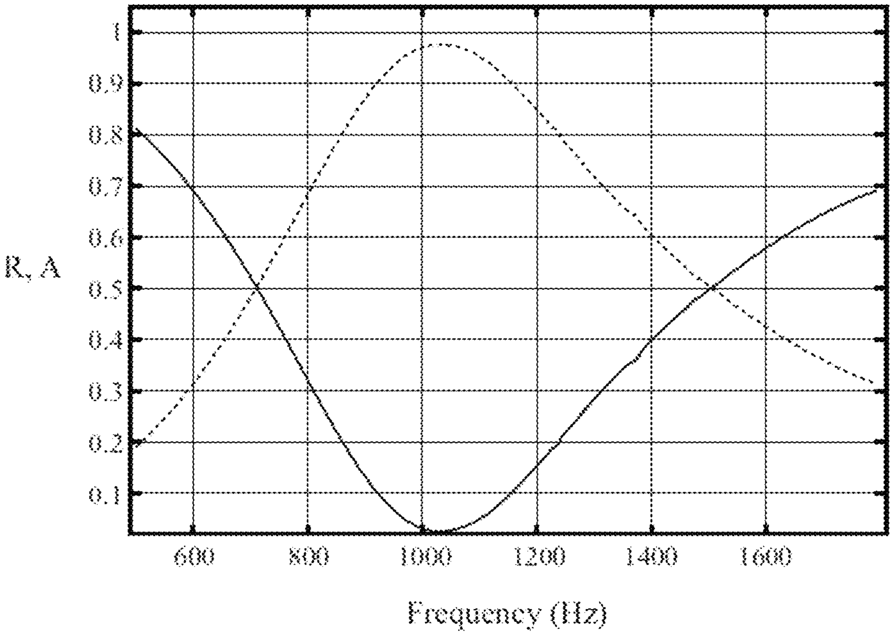
FIG. 7B is a plot of simulated reflectance/absorption as a function of an acoustic frequency for an acoustic resonator with fabric.

Referring now to FIGS. 7A-7B, one example of acoustic reflection (solid line) and acoustic absorption (dotted line) by a sound absorbing device according to the teachings of the present disclosure is shown. Particularly, an acoustic resonator with, and without, at least one fabric layer was evaluated for acoustic absorption for frequencies between 500 Hz and 1800 Hz. Referring to FIG. 7A, a plot of reflectance/absorption as a function of acoustic frequencies between 500 Hz and 1800 Hz for the acoustic resonator without a fabric layer is shown. And referring to FIG. 7B, a plot of reflectance/absorption as a function of acoustic frequencies between 500 Hz and 1800 Hz for the acoustic resonator with a fabric layer is shown. As observed from FIG. 7A the acoustic resonator without the fabric layer generally reflected (solid line) all of the acoustic frequencies between 500 Hz and 1800 Hz. In contrast, the acoustic resonator with the fabric layer 150 (FIG. 7B) absorbed (dotted line) about 90% of acoustic frequencies between about 925 Hz and about 1150 Hz, about 80% of acoustic frequencies between about 850 Hz and about 1225 Hz, about 70% of acoustic frequencies between about 800 Hz and about 1325 Hz, about 60% of acoustic frequencies between about 850 Hz and about 1400 Hz, and about 50% of acoustic frequencies between about 700 Hz and about 1500 Hz.

It should be understood from the teachings of the present disclosure that sound absorbing devices that include one or more acoustic resonators decorated with fabric are provided. The fabric can be at least one fabric layer that absorbs acoustic frequencies generally not absorbed by the one or acoustic resonators without the at least one fabric layer. That is, average pore size, the range of pore sizes, the distance and volume of gas between at least two fabric layers, and/or the elasticity and/or vibration properties of a fabric layer are adjustable such that an increased range of acoustic frequencies that are absorbed by the sound absorbing device is provided.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple variations or forms having stated features is not intended to exclude other variations or forms having additional features, or other variations or forms incorporating different combinations of the stated features.

As used herein the terms "generally" and "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should be also understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A sound absorbing device comprising:
- an acoustic resonator comprising a lossy resonator with an opening and a predefined range of acoustic frequencies;
- at least one fabric layer extending across the opening, the at least one fabric layer comprising actuatable liquid crystal elastomer (LCE) fibers;
- a plurality of electrical wires extending across and in contact with the at least one fabric layer; and
- an electrical power source in electrical contact with and configured to supply electrical current to and heat the plurality of electrical wires and thereby the actuatable LCE fibers such that an average pore size of the at least one fabric layer changes and the predefined range of acoustic frequencies of the lossy resonator is adjusted as a function of temperature.

2. The sound absorbing device according to claim 1, wherein the opening is a slit.

3. The sound absorbing device according to claim 1, wherein the acoustic resonator with the opening comprises a plurality of lossy resonators with a plurality of openings and the at least one fabric layer extending across the opening comprises at least one fabric layer extending across the plurality of openings.

4. The sound absorbing device according to claim 1, wherein the actuatable LCE fibers are reversible actuatable LCE fibers.

5. The sound absorbing device according to claim 1, wherein the actuatable LCE fibers are electrospun actuatable LCE fibers.

6. The sound absorbing device according to claim 1, wherein the actuatable LCE fibers are direct ink write actuatable LCE fibers.

7. The sound absorbing device according to claim 1, wherein the average pore size of the at least one fabric layer decreases with increasing temperature and decreases with increasing temperature.

8. The sound absorbing device according to claim 1, wherein the average pore size of the at least one fabric layer ranges from about 0.1 μm to about 500 μm.

9. The sound absorbing device according to claim 1, wherein the average pore size of the at least one fabric layer ranges from about 0.2 μm to about 200 μm.

10. The sound absorbing device according to claim 1, wherein the average pore size of the at least one fabric layer ranges from about 0.5 μm to about 100 μm.

11. The sound absorbing device according to claim 1 further comprising a cooler configured to cool the at least one fabric layer such that the average pore size of the at least one fabric layer increases.

12. The sound absorbing device according to claim 11 further comprising a controller configured to command the electrical power source to supply electrical current to and heat the plurality of electrical wires and thereby the actuatable LCE fibers and command the cooler to cool the at least one fabric layer.

13. A sound absorbing device comprising:
- an acoustic resonator comprising a lossy resonator with an opening and a predefined range of acoustic frequencies;

at least one fabric layer extending across the opening, the at least one fabric layer comprising reversible actuatable liquid crystal elastomer (LCE) fibers;

a plurality of electrical wires extending across and in contact with the at least one fabric layer; and an electrical power source in electrical contact with and configured to supply electrical current to and heat the plurality of electrical wires and thereby the reversible actuatable LCE fibers and a cooler configured to cool the reversible actuatable LCE fibers such that an average pore size of the at least one fabric layer increases with decreasing temperature and decreases with increasing temperature.

14. The sound absorbing device according to claim 13, wherein the average pore size of the at least one fabric layer ranges from about 0.2 μm to about 200 μm.

15. A sound absorbing device comprising:

an acoustic resonator comprising a lossy resonator with an opening and a predefined range of acoustic frequencies;

at least one fabric layer extending across the opening, the at least one fabric layer comprising reversible actuatable liquid crystal elastomer (LCE) fibers such that an average pore size of the at least one fabric layer increases with decreasing temperature and decreases with increasing temperature;

a plurality of electrical wires extending across and in contact with the at least one fabric layer;

an electrical power source in electrical contact with and configured to supply electrical current to and heat the plurality of electrical wires and thereby the reversible actuatable LCE fibers such that an average pore size of the at least one fabric layer changes and the predefined range of acoustic frequencies of the lossy resonator is adjusted as a function of temperature; and a controller configured to command the electrical power source to supply electrical current to and heat the plurality of electrical wires and thereby the reversible actuatable LCE fibers such that an average pore size of the at least one fabric layer changes and the predefined range of acoustic frequencies of the lossy resonator is adjusted as a function of temperature.

16. The sound absorbing device according to claim 15, wherein the average pore size of the at least one fabric layer ranges from about 0.2 μm to about 200 μm.

17. The sound absorbing device according to claim 16, wherein the average pore size of the at least one fabric layer ranges from about 0.5 μm to about 100 μm.

18. The sound absorbing device according to claim 15, wherein the reversible actuatable LCE fibers are electrospun actuatable LCE fibers.

19. The sound absorbing device according to claim 15, wherein the reversible actuatable LCE fibers are direct ink write actuatable LCE fibers.

20. The sound absorbing device according to claim 15 further comprising a cooler configured to cool the at least one fabric layer such that the average pore size of the at least one fabric layer increases.

* * * * *